(12) United States Patent
Streeter et al.

(10) Patent No.: US 11,338,479 B2
(45) Date of Patent: May 24, 2022

(54) AUTOCLAVE, AUTOCLAVE SYSTEM, AND METHOD FOR CURING A PART

(71) Applicant: The Boeing Company, Chicago, IL (US)

(72) Inventors: James M. Streeter, Provo, UT (US); Scott J. Nicholson, Herriman, UT (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 16/733,529

(22) Filed: Jan. 3, 2020

(65) Prior Publication Data

US 2021/0206029 A1 Jul. 8, 2021

(51) Int. Cl.
*B29C 35/02* (2006.01)
*B29C 35/04* (2006.01)
*B29K 105/06* (2006.01)

(52) U.S. Cl.
CPC ........ *B29C 35/0227* (2013.01); *B29C 35/045* (2013.01); *B29C 2035/048* (2013.01); *B29K 2105/06* (2013.01)

(58) Field of Classification Search
CPC .............. B29C 35/0227; B29C 35/045; B29C 2035/048; B29C 2035/046
See application file for complete search history.

(56) References Cited

U.S. PATENT DOCUMENTS

| | | | | |
|---|---|---|---|---|
| 2,713,702 A | * | 7/1955 | Jewell | A61L 2/07 422/105 |
| 3,150,935 A | * | 9/1964 | Matteson | B01J 3/04 422/105 |
| 4,532,984 A | * | 8/1985 | Smith, Jr. | A61L 2/07 165/61 |
| 6,673,277 B1 | * | 1/2004 | Joseph | B29C 43/18 264/1.24 |
| 2009/0155403 A1 | * | 6/2009 | Busch | B29C 35/045 425/523 |
| 2012/0003597 A1 | * | 1/2012 | Mason | F27B 17/0083 432/10 |
| 2013/0313760 A1 | * | 11/2013 | Kondo | F27B 17/0083 264/500 |
| 2019/0091952 A1 | * | 3/2019 | Nelson | B29C 35/045 |

OTHER PUBLICATIONS

Dynamic Boosting Systems, Steam Compressor/Energy Recovery, https://dynamicboost.com/steam-compressors, accessed Dec. 13, 2019.

* cited by examiner

*Primary Examiner* — Kelly M Gambetta
*Assistant Examiner* — Virak Nguon
(74) *Attorney, Agent, or Firm* — Kunzler Bean & Adamson

(57) ABSTRACT

Disclosed here is an autoclave system for curing a part. The autoclave includes a gas recirculation system, at least partially external to a vessel pf the autoclave system and fluidly coupleable to the vessel such that gas contained in the vessel is delivered to the gas recirculation system, passed through the gas recirculation system, and recirculated back into the vessel. The autoclave system also comprises at least one mold core, located within the vessel. The mold core comprises a conduit extending through the mold core and the mold core is configured to define a shape of the part. The gas delivered to the gas recirculation system from the vessel is gas received directly from the conduit of the mold core.

20 Claims, 6 Drawing Sheets

AUTOCLAVE, AUTOCLAVE SYSTEM, AND METHOD FOR CURING A PART

FIELD

This disclosure relates generally to curing composite parts, and more particularly to curing composite parts using an autoclave.

BACKGROUND

Autoclaves provide the heat and pressure necessary to cure composite parts made of curable materials, such as fiber-reinforced polymer materials including catalyzing resins (e.g., epoxies or polyesters). For certain parts with complex shapes, heating some portions of the part, such as internally situated portions, using an autoclave can be difficult due to the mass of the part.

SUMMARY

The subject matter of the present application provides examples of an autoclave, an autoclave system, and a method of curing parts that overcome the above-discussed shortcomings of prior art techniques. Accordingly, the subject matter of the present application has been developed in response to the present state of the art, and in particular, in response to shortcomings of conventional autoclaves and methods of curing parts.

Disclosed here is an autoclave system for curing a part. The autoclave system comprises an autoclave that includes a vessel, containing a gas. The autoclave also comprises at least one circulator, located within the vessel and operable to circulate the gas within the vessel. The autoclave further comprises at least one heater, located within the vessel and operable to heat the gas within the vessel. The autoclave additionally comprises a gas recirculation system, at least partially external to the vessel and fluidly coupleable to the vessel such that gas contained in the vessel is delivered to the gas recirculation system, passed through the gas recirculation system, and recirculated back into the vessel. The autoclave system also comprises at least one mold core, located within the vessel. The mold core comprises a conduit extending through the mold core and the mold core is configured to define a shape of the part. The gas delivered to the gas recirculation system from the vessel is gas received directly from the conduit of the mold core. The preceding subject matter of this paragraph characterizes example 1 of the present disclosure.

The gas recirculation system comprises a compressor that is operable to pressurize the gas received from the conduit of the mold core before the gas is recirculated back into the vessel. The preceding subject matter of this paragraph characterizes example 2 of the present disclosure, wherein example 2 also includes the subject matter according to example 1, above.

The gas within the vessel is at a first pressure. The compressor is operable to pressurize the gas received from the conduit of the mold core to a second pressure greater than the first pressure such that the gas flows back into the vessel. The preceding subject matter of this paragraph characterizes example 3 of the present disclosure, wherein example 3 also includes the subject matter according to example 2, above.

The first pressure is at least 90 pounds-per-square-inch (psi). The second pressure is at least 100 psi. A temperature of the gas within the vessel and the gas recirculation system is at least 350 degrees Fahrenheit. The preceding subject matter of this paragraph characterizes example 4 of the present disclosure, wherein example 4 also includes the subject matter according to example 3, above.

The gas recirculation system further comprises a gas reservoir that is configured to receive the gas from the conduit of the mold core and deliver the gas, received by the gas reservoir, to the compressor. The preceding subject matter of this paragraph characterizes example 5 of the present disclosure, wherein example 5 also includes the subject matter according to any one of examples 2-4, above.

The gas recirculation system further comprises a first recirculation conduit that is fluidly coupled to the conduit of the mold core and the gas reservoir such that the gas flows from the conduit of the mold core to the gas reservoir via the first recirculation conduit. The gas recirculation system additionally comprises a second recirculation conduit that is fluidly coupled to the gas reservoir and the compressor such that the gas flows from the gas reservoir to the compressor via the second recirculation conduit. The first recirculation conduit has a first flow diameter. The second recirculation conduit has a second flow diameter. The second flow diameter is greater than the first flow diameter. The preceding subject matter of this paragraph characterizes example 6 of the present disclosure, wherein example 6 also includes the subject matter according to example 5, above.

The vessel comprises a first chamber and a second chamber. The mold core is located within the first chamber. The circulator receives the gas, flowing through the first chamber in a first flow direction, after passing around the mold core and delivers the gas to the second chamber. The gas recirculation system recirculates the gas into the first chamber of the vessel at a location downstream of the mold core and upstream of the circulator. The preceding subject matter of this paragraph characterizes example 7 of the present disclosure, wherein example 7 also includes the subject matter according to any one of examples 1-6, above.

The autoclave system further comprises a valve that receives the gas directly from the conduit of the mold core. Operation of the valve is switchable between a first state and a second state. In the first state, the valve directs the gas received directly from the conduit of the mold core to the gas recirculation system. In the second state, the valve vents the gas received directly from the conduit of the mold core to atmosphere. The preceding subject matter of this paragraph characterizes example 8 of the present disclosure, wherein example 8 also includes the subject matter according to any one of examples 1-7, above.

The conduit of the mold core comprises an inlet end and an outlet end. A diameter of the conduit at the inlet end is greater than at the outlet end. The preceding subject matter of this paragraph characterizes example 9 of the present disclosure, wherein example 9 also includes the subject matter according to any one of examples 1-8, above.

The mold core further comprises a filter located within the conduit. The preceding subject matter of this paragraph characterizes example 10 of the present disclosure, wherein example 10 also includes the subject matter according to any one of examples 1-9, above.

The gas delivered to the gas recirculation system from the vessel is only gas that has passed through the conduit of the mold core. The preceding subject matter of this paragraph characterizes example 11 of the present disclosure, wherein example 11 also includes the subject matter according to any one of examples 1-10, above.

The gas comprises an inert gas. The preceding subject matter of this paragraph characterizes example 12 of the present disclosure, wherein example 12 also includes the subject matter according to any one of examples 1-11, above.

The autoclave system further comprises a plurality of mold cores located within the vessel. The gas delivered to the gas recirculation system from the vessel is gas received directly from the conduit of each one of the plurality of mold cores. The preceding subject matter of this paragraph characterizes example 13 of the present disclosure, wherein example 13 also includes the subject matter according to any one of examples 1-12, above.

The mold core is configured to define the shape of a circumferentially enclosed portion of the part. The conduit is circumferentially enclosed and extends entirely through an interior of the mold core. The preceding subject matter of this paragraph characterizes example 14 of the present disclosure, wherein example 14 also includes the subject matter according to any one of examples 1-13, above.

Further disclosed herein is an autoclave. The autoclave comprises a vessel, containing a gas. The autoclave also comprises at least one circulator, located within the vessel and operable to circulate the gas within the vessel. The autoclave further comprises at least one heater, located within the vessel and operable to heat the gas within the vessel. The autoclave additionally comprises a gas recirculation system, at least partially external to the vessel and fluidly coupleable to the vessel such that gas contained in the vessel is delivered to the gas recirculation system, passed through the gas recirculation system, and recirculated back into the vessel. The preceding subject matter of this paragraph characterizes example 15 of the present disclosure.

The gas recirculation system comprises a compressor that is operable to pressurize the gas received from the vessel before the gas is recirculated back into the vessel. The preceding subject matter of this paragraph characterizes example 16 of the present disclosure, wherein example 16 also includes the subject matter according to example 15, above.

Only a portion of the gas within the vessel is delivered to the gas recirculation system. The preceding subject matter of this paragraph characterizes example 17 of the present disclosure, wherein example 17 also includes the subject matter according to any one of examples 15-16, above.

Additionally disclosed herein is a method of curing a part. The method comprises locating the part within a vessel of an autoclave. The method also comprises heating and pressurizing a gas within the vessel while the part is located within the vessel. The method further comprises recirculating the gas from the vessel to a gas recirculation system, external to the vessel, and from the gas recirculation system back into the vessel while heating and pressurizing the gas and while the part is located within the vessel. The preceding subject matter of this paragraph characterizes example 18 of the present disclosure.

The method further comprises locating at least one mold core within the part. The mold core comprises a conduit extending through the mold core. The gas within the vessel of the autoclave is heated and pressurized while the mold core and the part are located within the vessel. The gas is directed directly from the conduit of the mold core to the gas recirculation system. The preceding subject matter of this paragraph characterizes example 19 of the present disclosure, wherein example 19 also includes the subject matter according to example 18, above.

The method further comprises selectively bypassing the gas recirculation system and venting the gas from the vessel to atmosphere. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are various examples of an autoclave, and a corresponding autoclave system, that recirculates gas taken from a vessel of the autoclave back into the vessel. To promote uniform heating of complex parts, such as those with internal features, the autoclave of the present disclosure directs a portion of heated and pressurized gas through one or more mold cores that define a shape of the internal features. The gas heats the mold cores, as it passes though the mold cores, and heat from the mold cores is transferred to the internal features to help cure the internal features in a uniform manner relative to external features of a part. Redirection of the gas through the mold cores is facilitated by directing gas from the mold cores out of the vessel. In some examples, the gas directed from the vessel is vented to atmosphere and lost. The vented gas is then replaced by new gas that is pumped into the vessel. Because the gas has an associated cost, venting gas to the atmosphere results in an unrecoverable economic loss. However, certain examples of the autoclave and autoclave system of the present disclosure avoid such economic loss by taking the gas, which has been directed out of the vessel, and recirculating it back into the vessel. In this manner, uniform heating of parts, such as by using mold cores, can be accomplished without the loss of autoclave gasses to the atmosphere.

Figure 1:
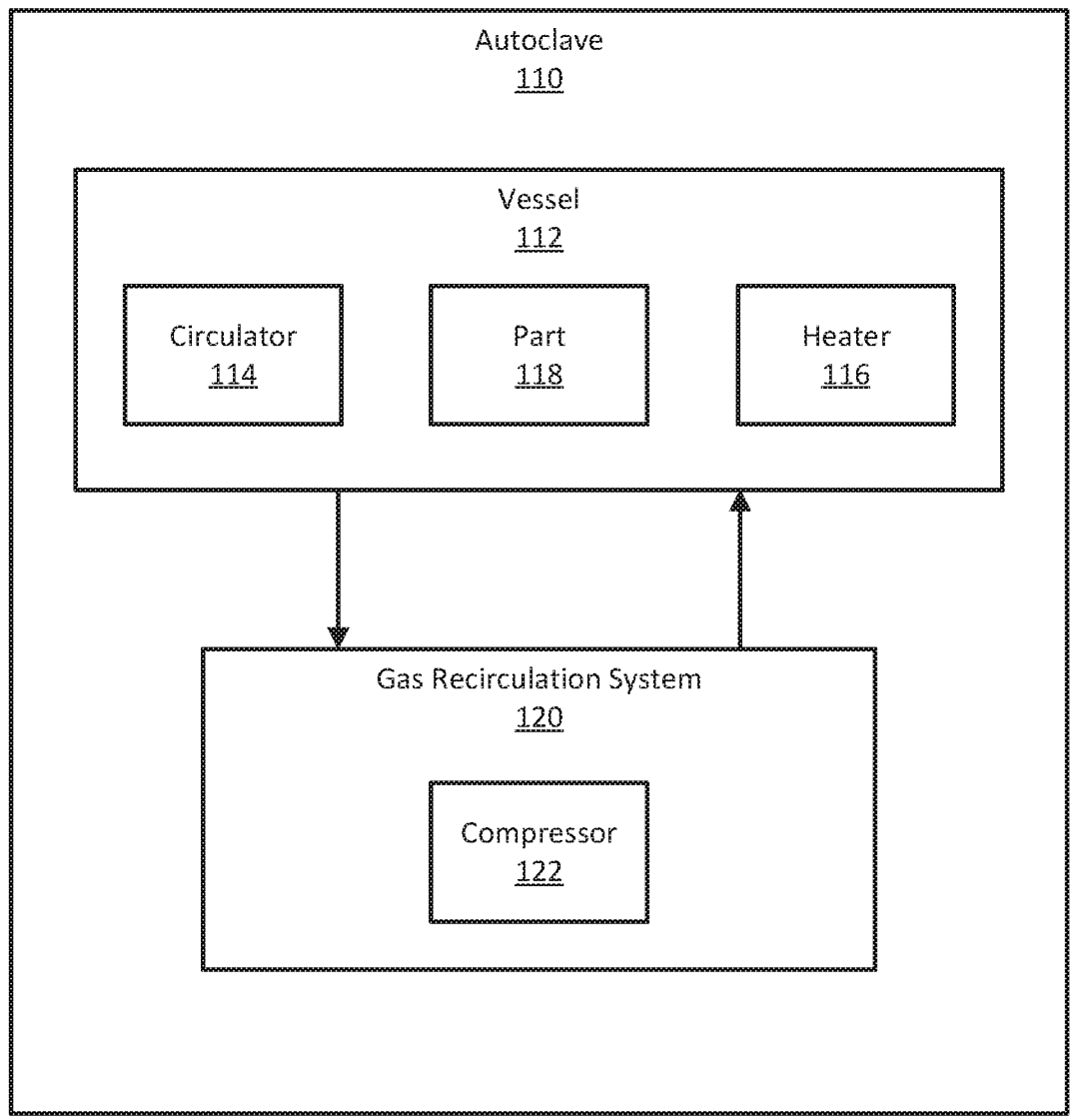
FIG. 1 is a schematic block diagram of an autoclave, according to one or more examples of the present disclosure.

Referring to FIG. 1, according to some examples of the present disclosure, an autoclave 110 includes a vessel 112 and a gas recirculation system 120. The vessel 112 is configured to contain a part 118 within the vessel 112. Additionally, the vessel 112 includes a circulator 114 and a heater 116 that are also contained within the vessel 112. The circulator 114 is operable to circulate a gas contained within the vessel 112. The heater 116 is operable to heat the gas contained within the vessel 112. The gas within the vessel 112 is heated by the heater 116 to an operational temperature conducive to curing the part 118. Although one heater 116 is shown in FIG. 1, the vessel 112 can include more than one heater 116, such as two heaters 116 shown in FIG. 3. Moreover, the heater 116 can be an electric heater or a gas heater. The operational temperature of the gas is dependent on the curing temperature of the part 118. According to some examples, the operational temperature of the gas circulating in the vessel 112 is at least 350 degrees Fahrenheit, in certain implementations, and at least 400 degrees Fahrenheit, in some implementations. In yet other implementations, the operational temperature of the gas circulating in the vessel 112 is as low as 180 degrees and as high as at least 600 degrees Fahrenheit. The heated gas is circulated around the part 118 by the circulator 114. Circulation of the heated gas helps to accelerate the transfer of heat from the gas to the part 118 via convection by improving the efficiency of the heat transfer process.

To further aid in heating and curing the part 118, the gas within the vessel 112 is pressurized to an operational pressure above atmospheric pressure. In some examples, the gas is pressurized to at least 90 pounds-per-square-inch (psi). Pressurizing the gas promotes the transfer of heat to the part 118 and improves the rate at which the part 118 cures. Additionally, pressurizing the gas in the vessel 112 helps to compress the part 118, which promotes a reduction in the voids or air pockets within the laminated features of the part. Pressurization of the gas can be provided by a pressurized gas source that introduces pressurized gas into the vessel 112 prior to curing the part 118.

Under some circumstances, one of which is described in detail below, releasing or venting of the heated and pressurized gas from the vessel 112, while the part 118 is cured by the autoclave 110, is desired. In other circumstances, however, rather than replace the released gas with new gas, the gas recirculation system 120 of the autoclave 110 receives the released gas and recirculates it back into the vessel 112 (as indicated by the directional arrows) after passing through the gas recirculation system 120. In this manner, the autoclave 110 helps reduce manufacturing costs by reusing gas released from the vessel 112. Because the pressure of the gas released from the vessel 112 often decreases upon release from the pressurized environment of the vessel 112, the gas recirculation system 120 includes a compressor 122 that compresses the gas received from the vessel 112, and increases its pressure to a pressure above the pressure of the gas within the vessel 112, which induces flow of the gas back into the vessel 112 from the gas recirculation system.

Figure 3:
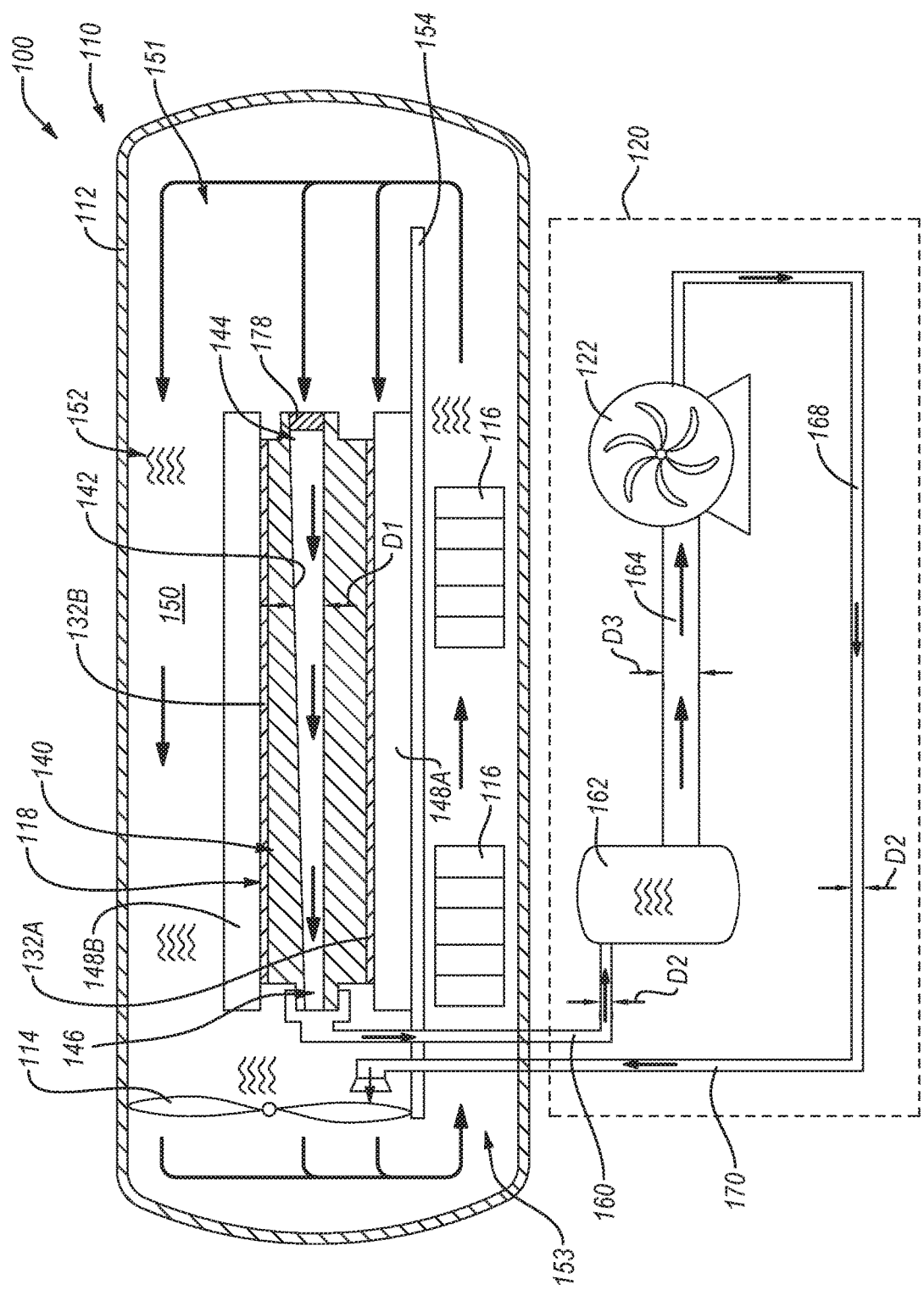
FIG. 3 is a partially cross-sectional schematic block diagram of an autoclave system, according to one or more examples of the present disclosure.

As shown in FIG. 3, the autoclave 110 forms part of an autoclave system 100 in some examples. The autoclave system 100 includes the autoclave 110 and a mold core 140 located within the vessel 112 of the autoclave 110. In some examples, the mold core 140 is coupled to the part 118 before the part 118 is located in the vessel 112. In other words, the mold core 140 is located in the vessel 112 as the part 118 is located in the vessel 112. The mold core 140 is configured to define the shape of the part 118. More specifically, the mold core 140 is configured to help define internal portions or surfaces of the part 118 that oppose external portions or surfaces of the part, which are defined by other molds. Accordingly, the mold core 140 forms part of an overall mold that shapes the entirety of the part 118. For example, in FIG. 3, the overall mold includes a lower mold 148A and an upper mold 148B between which the part 118 is sandwiched. The lower mold 148A helps shape a lower external surface of the part 118 and the upper mold 148B helps shape an upper external surface of the part 118. Other mold portions, which are not shown, can be used to help shape other surfaces of the part 118. The mold core 140, as well as the lower mold 148A and the upper mold 148B are made of a material with a relatively high thermal conductivity, such as a metallic material (e.g., copper, steel, aluminum, etc.).

Figure 2:
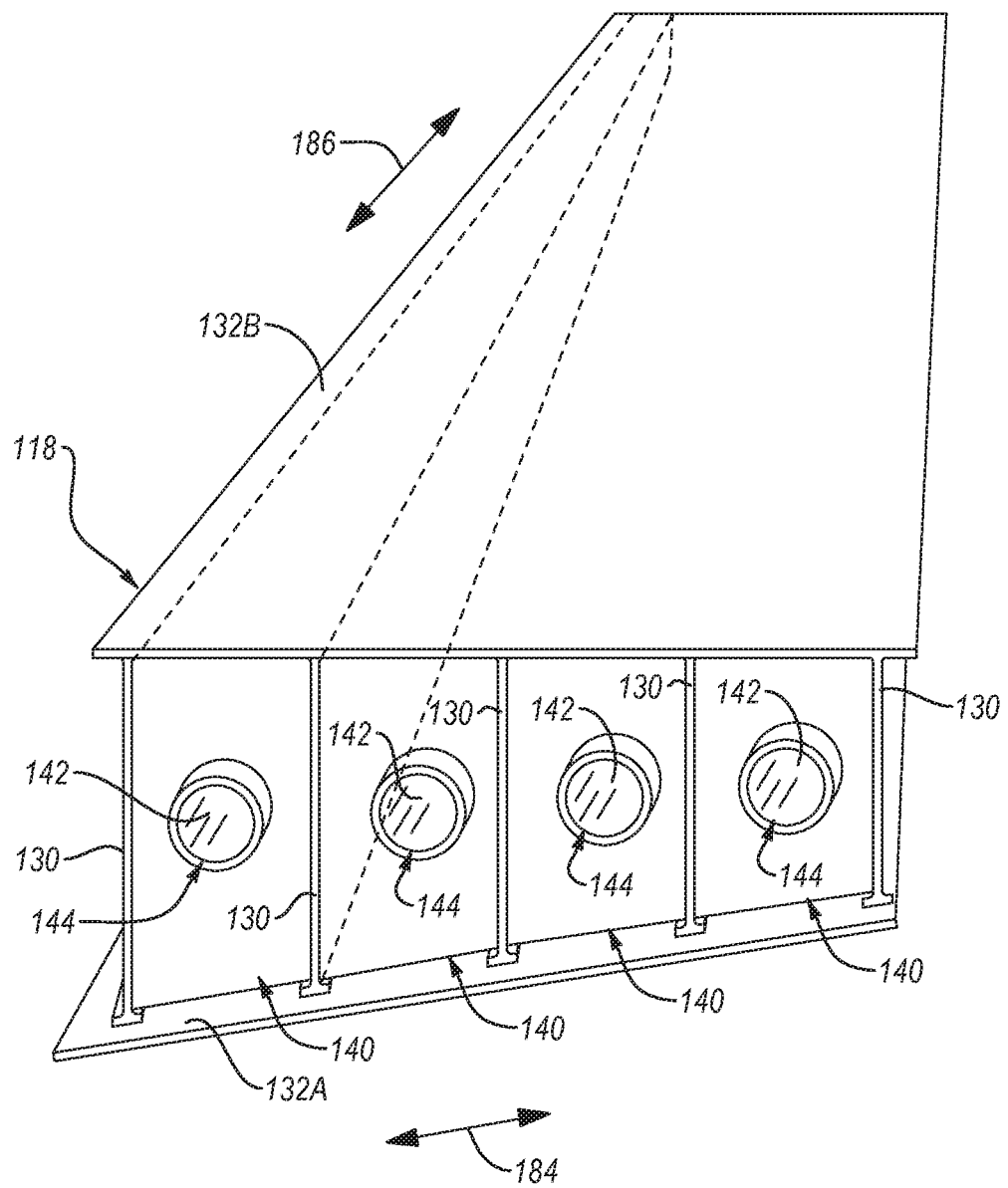
FIG. 2 is a perspective end view of a part and mold cores helping to shape the part, according to one or more examples of the present disclosure.

As shown in FIG. 2, the mold core 140 is located within the part 118 against internal surfaces of the part 118. In one example, the part 118 is a wing or stabilizer of an aircraft. In such an example, the part 118 includes a bottom panel 132A, a top panel 132B, and multiple webs or stringers 130 between the bottom panel 132A and the top panel 132B. The bottom panel 132A and the top panel 132B are spaced apart by the stringers 130, which extend uprightly between and are joined to the bottom panel 132A and the top panel 132B. The stringers 130 are spaced apart from each other across a width of the wing or stabilizer, in a chordwise direction 184, and extend lengthwise along a length of the wing or stabilizer, in a spanwise direction 186. The joining of the stringers 130, the bottom panel 132A, and the top panel 132B in this manner defines circumferentially-enclosed hollow channels, each defined between the bottom panel 132A, the top panel 132B, and two adjacent ones of the stringers 130. Accordingly, the hollow channels are defined by internal surfaces of the bottom panel 132A, the top panel 132B, and the stringers 130 and extend spanwise along the wing or stabilizer. In the example in FIG. 2, the autoclave system 100 includes a plurality of mold cores 140 with each one of the mold cores 140 located within a corresponding one of the hollow channels of the part 118.

Although the part 118 in FIG. 2 is depicted as a wing or stabilizer of an aircraft, in other examples, the part 118 is a different part or component of an aircraft, or other mobile structure, or a non-mobile structure.

The mold cores 140 maintain the shape of the hollow channels of the part 118 before and while the part 118 is cured. The part 118 is made of a curable material, such as a thermoset material. In some examples, the part 118 is made of a fiber-reinforced polymer material, such as a carbon-fiber-reinforced polymer material. More specifically, each one of the bottom panel 132A, the top panel 132B, and the stringers 130 are made of a laminated sheet of multiple layers or plies of a fiber-reinforced polymer material. Prior to shaping the part 118 with the mold cores 140, the polymer (e.g., resin or epoxy) of the fiber-reinforced polymer material is in an uncured or raw state. Accordingly, prior to curing, the laminated sheets that form the bottom panel 132A, the top panel 132B, and the stringers 130 are highly malleable or deformable. In this state, the laminated sheets require the rigidity of the mold cores 140 to be formed and held in shape in preparation for and during curing of the polymer of the fiber-reinforced polymer material.

The mold cores 140, with the laminated sheets of fiber-reinforced polymer material formed thereabout, as well as any additional mold portions, such as the lower mold 148A and the upper mold 148B, are positioned within an internal cavity 150 the vessel 112. Referring to FIG. 3, the vessel 112 includes a floor 154 or platform that supports the mold cores 140, the part 118, and any other mold portions. In some examples, the vessel 112 includes stand-offs that raise the mold cores 140, mold portions, and the part 118 above the floor 154 to promote the flow of gas underneath the part 118. The floor 154 also divides the internal cavity 150 of the vessel 112 into a first chamber 151 and a second chamber 153. The mold cores 140 and the part 118 are located in the first chamber 151.

Curing the uncured polymer of the fiber-reinforced polymer material of the part 118 includes heating the uncured polymer up to at least a curing temperature of the polymer. Heating the uncured polymer in this manner results in the hardening of the polymer by cross-linking polymer chains of the polymer. Once hardened via the curing process, the chemical transformation of the polymer is irreversible. For best results, the uncured polymer is uniformly heated to ensure the chemical composition and strength of the cured fiber-reinforced polymer material is consistent throughout the part 118.

The vessel 112 is configured to help facilitate uniform heating of the uncured fiber-reinforced polymer material of the part 118 by circulating a gas 152 through the internal cavity 150 of the vessel 112. Referring to FIG. 3, the gas 152 is circulated through the first chamber 151 in a first flow direction and circulated through the second chamber 153 in a second flow direction that is opposite the first flow direction. In the illustrated example, the circulator 114, which is a single fan or multiple fans in some implementations, is located in the first chamber 151 downstream of the part 118. Accordingly, the gas 152 in the first chamber 151 flows in the first flow direction toward the circulator 114, which receives the gas 152 in the first chamber 151 and drives the received gas into the second chamber 153. In this manner, the gas 152 inside the vessel 112 experiences a circular flow around the floor 154.

The gas 152 is an inert gas in some examples. More specifically, according to one example, the gas 152 is a nitrogen gas. The inert nature of the gas 152 helps prevent unintended reactions, such as combustion events, within the vessel 112. However, in some examples, the gas 152 is a gas other than an inert gas, such as air, which in some situations would help to retain heat in the system 100. The gas 152 is initially supplied to the vessel 112 from a gas source (not shown). As mentioned, pressurization of the gas 152 also helps to improve the curing process by increasing the pressure applied to the part 118 during the curing process. In some examples, additional pressure is applied to the part 118 during the curing process by isolating the part 118, relative to the internal cavity 150 of the vessel 112, within a hermetically sealed container and pulling pressure from the hermetically sealed container to create vacuum conditions within the hermetically sealed container.

As the heated and pressurized gas 152 is circulated about the part 118, less accessible surfaces, such as internal surfaces, of the part 118 may not be heated as quickly as more accessible surfaces, such as external surfaces. Accordingly, the mold cores 140 are configured to help forcefully distribute heated and pressurized gas 152 to the mold cores 140 and thus to the internal surfaces of the part 118 to promote more uniform heating of the part 118. The plurality of mold cores 140 are similarly configured. Accordingly, the following description of a mold core 140 is applicable to each one of the plurality of mold cores 140 of the autoclave system 100.

The mold core 140 includes a conduit 142 extending through the mold core 140. For example, the conduit 142 is elongated and extends lengthwise, along a length of the mold core 140, through an interior of the mold core 140. The conduit 142 is circumferentially closed, but open at opposing ends of the mold core 140. More specifically, the conduit 142 includes an inlet end 144, at an upstream end of the mold core 140, and an outlet end 146, at a downstream end of the mold core 140. Moreover, the conduit 142 has a cross-sectional dimension (e.g., diameter D1) that changes along the length of the conduit 142 from the inlet end 144 to the outlet end 146. In certain examples, as shown, the diameter D1 of the conduit 142 decreases from the inlet end 144 to the outlet end 146. According to one example, the diameter D1 of the conduit 142 steadily decreases along an entirety of the conduit 142 from the inlet end 144 to the outlet end 146. In such an example, the diameter D1 at the inlet end 144 is greater than the diameter D1 at the outlet end 146. The converging nature of the conduit 142 from the inlet end 144 to the outlet end 146 promotes the flow of gas 152 through the conduit 142. In particular, the convergence of the conduit 142 from the inlet end 144 to the outlet end 146 promotes an increase the flow speed of the gas through the conduit 142, which helps to transfer heat from the gas 152 into the mold core 140 due to molecular intimacy.

The mold core 140 additionally includes a filter 178 located within the conduit 142 in some examples. The filter 178 can be located anywhere along the conduit 142. However, to promote accessibility and replacement, the filter 178 is positioned at the inlet end 144 of the conduit 142. The filter 178 is configured to capture debris and particulates that may be harmful to operation of the compressor 122 of the gas recirculation system 120.

When situated in the vessel 112, the inlet end 144 of the mold core 140 is open to the internal cavity 150 of the vessel 112. Accordingly, the gas 152 in the internal cavity 150 is free to pass through the inlet end 144, enter the conduit 142, and flow through the conduit 142 to the outlet end 146. The outlet end 146 of the conduit 142 is closed to the internal cavity 150 of the vessel 112 such that the gas 152 flowing through the conduit 142 does not exit the conduit 142 directly into the internal cavity 150. Rather, the gas 152 flowing through the conduit 142 exits the conduit 142 directly into the gas recirculation system 120 of the autoclave system 100.

The gas recirculation system 120 facilitates recirculation of the gas 152 from the conduit 142 back into the internal cavity 150 of the vessel 112. Referring again to FIG. 3, the gas recirculation system 120 includes a first recirculation conduit 160 that is fluidly coupled to the outlet end 146 of the conduit 142 such that all gas 152 flowing through the conduit 142 enters the first recirculation conduit 160. The first recirculation conduit 160 passes through the wall of the vessel 112 to move the gas 152 to a location external to the vessel 112. Fluid coupling between the outlet end 146 of the conduit 142 and the first recirculation conduit 160 is facilitated by any of various fittings, which, in some examples, provide selectively releasable coupling. The first recirculation conduit 160 is further fluidly coupled to a gas reservoir 162 of the gas recirculation system 120. Accordingly, the gas 152 in the conduit 142 (and only the gas 152 in the conduit 142) flows from the vessel 112 to the gas reservoir 162 via the first recirculation conduit 160. In other words, only a portion of the gas 152 within the vessel 112 is delivered to the gas recirculation system 120.

The gas reservoir 162 is external to the vessel 112. Moreover, the gas reservoir 162 has a cross-sectional dimension (e.g., volume per unit length) that is significantly larger than that of the first recirculation conduit 160, which has a cross-sectional dimension (e.g., diameter D2). The gas 152 from the first recirculation conduit 160 slows down in the gas reservoir 162, which helps mitigate pressure or flow rate spikes in the gas 152 flowing from the vessel 112.

The gas recirculation system 120 also includes a compressor 122, external to the vessel 112, that receives the gas 152 from the gas reservoir 162 via a second recirculation conduit 164 of the gas recirculation system 120. The second recirculation conduit 164 is fluidly coupled to the gas reservoir 162 at one end and fluidly coupled to the compressor 122 at an opposite end. The second recirculation conduit 164 has a cross-sectional dimension (e.g., diameter D3). The diameter D3 of the second recirculation conduit 164 is greater than the diameter D2 of the first recirculation conduit 160, which promotes uniformity of the flow rate of the gas 152 from the gas reservoir 162 into the compressor 122. In one example, the diameter D2 of the first circulation conduit 160 is about two inches and the diameter D3 of the second recirculation conduit 164 is between about three inches and four inches.

The compressor 122 is operable to pressurize the gas 152 received from the gas reservoir 162 via the second recirculation conduit 164. The compressor 122 is a turbine-type compressor in some examples. Due to the high temperatures of the gas 152, the pressure of the gas 152 at the entrance of the compressor 122 is at or near the pressure of the gas 152 in the vessel 112. Because the pressure exiting the gas reservoir 162 is greater than the compressor inlet pressure, the creation of vacuum pressure at the compressor 122 draws the gas 152 through the second recirculation conduit 164, which in turn draws the gas 152 through the first recirculation conduit 160 and the conduit 142 of the mold core 140. In this manner, the gas recirculation system 120 draws or entrains a portion of the gas 152 in the vessel 112 into the conduit 142 of the mold core 140. The gas 152 entrained into the conduit 142 of the mold core 140, being heated and pressurized, transfers its heat to the mold core 140, which correspondingly transfers its heat to the internal surfaces of the part 118.

The compressor 122 pressurizes the gas 152 received from the second recirculation conduit 164 to a second pressure that is greater than a first pressure of the gas 152 in the vessel 112. In some examples, the second pressure is at least 100 psi. The first pressure of the gas 152 in the vessel 112 is at least atmospheric pressure, and in some examples, is greater than atmospheric pressure. The gas 152 at the second pressure is delivered from the compressor 122 to a third recirculation conduit 168 of the gas recirculation system 120. The third recirculation conduit 168 has a cross-sectional dimension (e.g., diameter D3). The diameter D3 of the third recirculation conduit 168 is less than the diameter D3 of the second recirculation conduit 164 and equal to the diameter D2 of the first recirculation conduit 160, in some examples. The third recirculation conduit 168 is fluidly coupled to the compressor 122 at a first end and is open to the internal cavity 150 of the vessel 112 at a second end opposite the first end. Because the second pressure of the gas 152 exiting the compressor 122 and delivered to the third recirculation conduit 168 is greater than the first pressure of the gas 152 in the vessel 112, the pressure differential drives the flow of the gas 152 in the third recirculation conduit 168 into the internal cavity 150 of the vessel 112.

The third recirculation conduit 168 passes through the wall of the vessel 112 such that the second end of the third recirculation conduit 168 is open to the internal cavity 150 of the vessel 112. According to some examples, the second end of the third recirculation conduit 168 is located within the first chamber 151 of the internal cavity 150 downstream of the mold core 140 and the part 118 and upstream of the circulator 114. Delivering the recirculated gas 152 into the vessel 112 at this location allows the recirculated gas 152 to be promptly mixed with the gas 152 in the vessel 112 by the circulator 114 before being directed into the second chamber 153 and before being introduced to the mold core 140 and the part 118 in the first chamber 151.

Each one of the recirculation conduits of the gas recirculation system 120 is shown schematically as a single, continuous, conduit. However, in some examples, one or more of the recirculation conduits are segmented or include multiple intercoupled segments.

Figure 4:
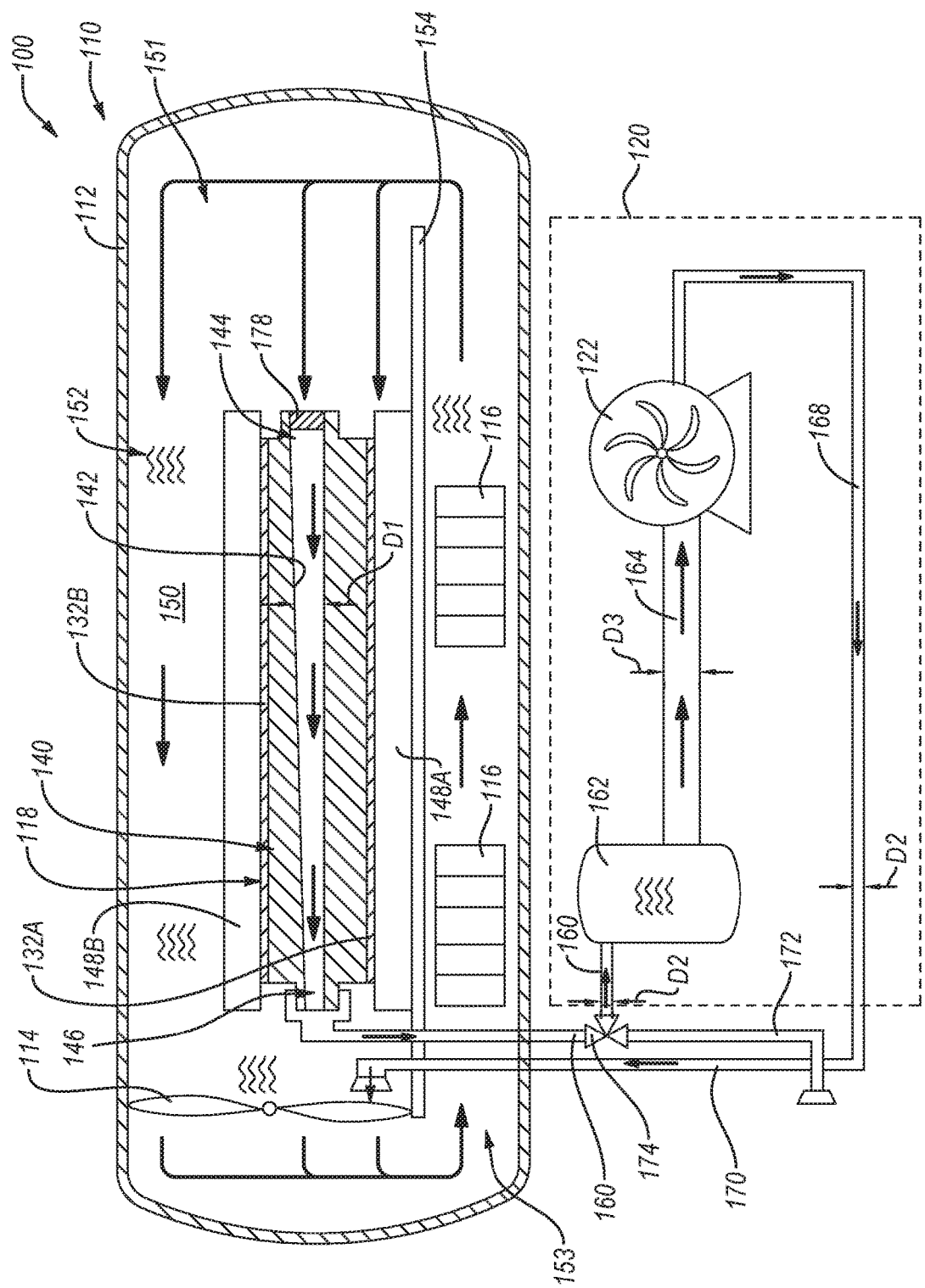
FIG. 4 is a partially cross-sectional schematic block diagram of an autoclave system, in a gas recirculation mode, according to one or more examples of the present disclosure.
Figure 5:
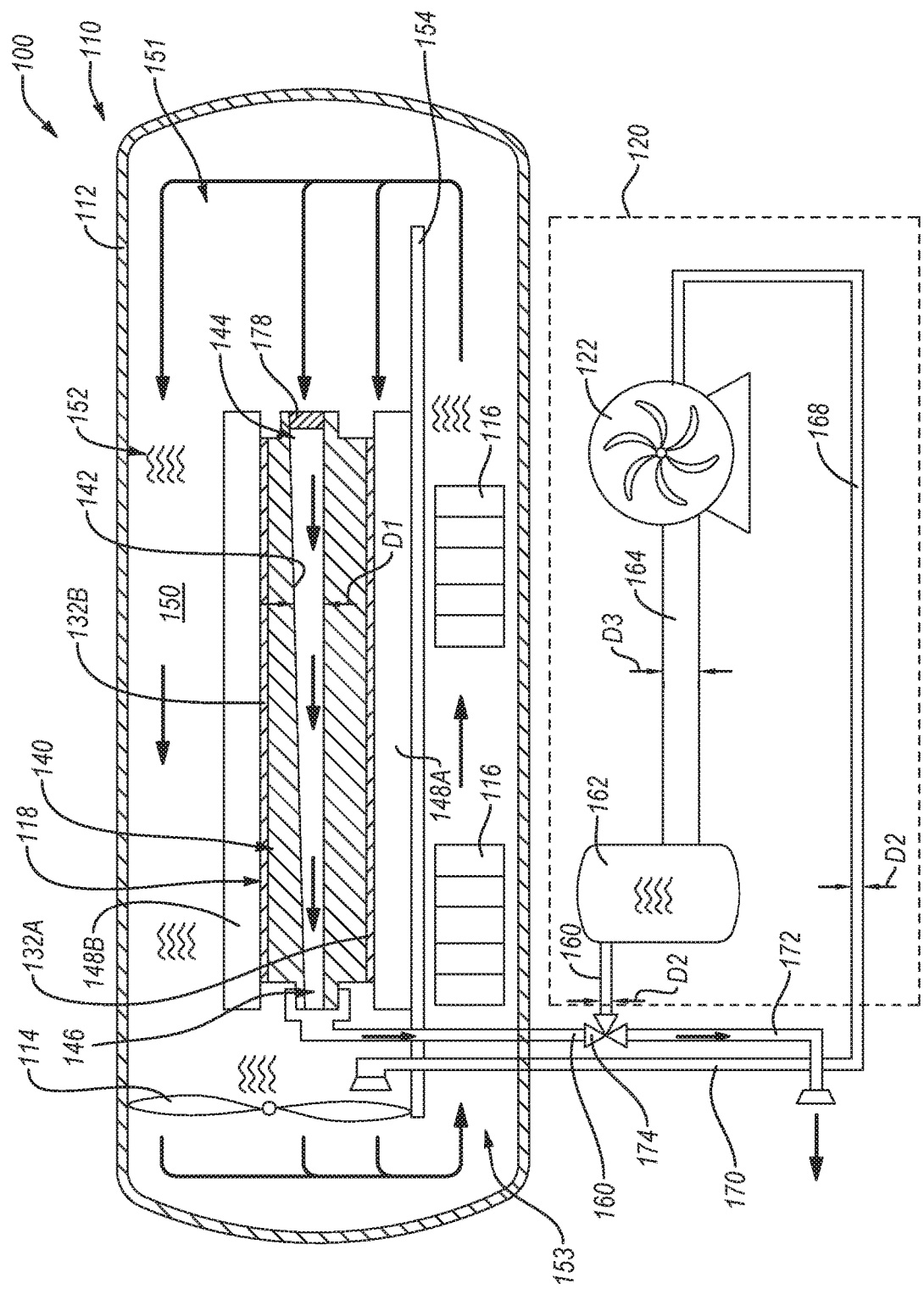
FIG. 5 is a partially cross-sectional schematic block diagram of the autoclave system of FIG. 4, in a gas venting mode, according to one or more examples of the present disclosure.

Generally, recirculating the gas 152 back into the vessel 112 is desirable to save on material and manufacturing costs. However, under certain circumstances, venting the gas 152, pulled through the conduit 142 of the mold core 140, to the atmosphere may be desirable. For example, should the compressor 122 become disabled or the gas recirculation system 120 become unable to recirculate the gas 152 back into the vessel 112, in certain implementations, such as shown in FIGS. 4 and 5, the autoclave system 100 further includes a valve 174 that is fluid coupled to the first recirculation conduit 160 to receive the gas 152 from the first recirculation conduit 160. In other words, the valve 174 receives the gas 152 directly from the conduit 142 of the mold core 140.

The valve 174 is a three-way valve that is fluidly coupleable to the gas reservoir 162 of the gas recirculation system 120 via a downstream portion of the first recirculation conduit 160 and fluidly coupleable to a venting conduit 172, which vents to the atmosphere. The valve 174 is switchable between a first state and a second state. In the first state (see, e.g., FIG. 4), the valve 174 is fluidly coupled to the gas reservoir 162 to direct the gas 152 from the conduit 142 of the mold core 140 to the gas reservoir 162 and then to the compressor 122 before returning to the vessel 112. In contrast, in the second state (see, e.g., FIG. 5), the valve 174 is fluidly coupled to the venting conduit 172 to vent the gas 152 from the conduit 142 of the mold core 140 to the atmosphere. In one example, the valve 174 operates in the first state when the gas recirculation system 120 is operable to recirculate the gas 152 back into the vessel 112, and operates in the second state when the gas recirculation system 120 is unable, such as to do a malfunction of the compressor 122, to recirculate the gas 152 back into the vessel 112. According to some examples, the valve 174 is automatically switchable between the first state and the second state based on inputs from one or more virtual or physical sensors configured to detect one or more disabling conditions of the gas recirculation system 120. In alternative examples, the valve 174 is manually switchable between the first state and the second state.

Figure 6:
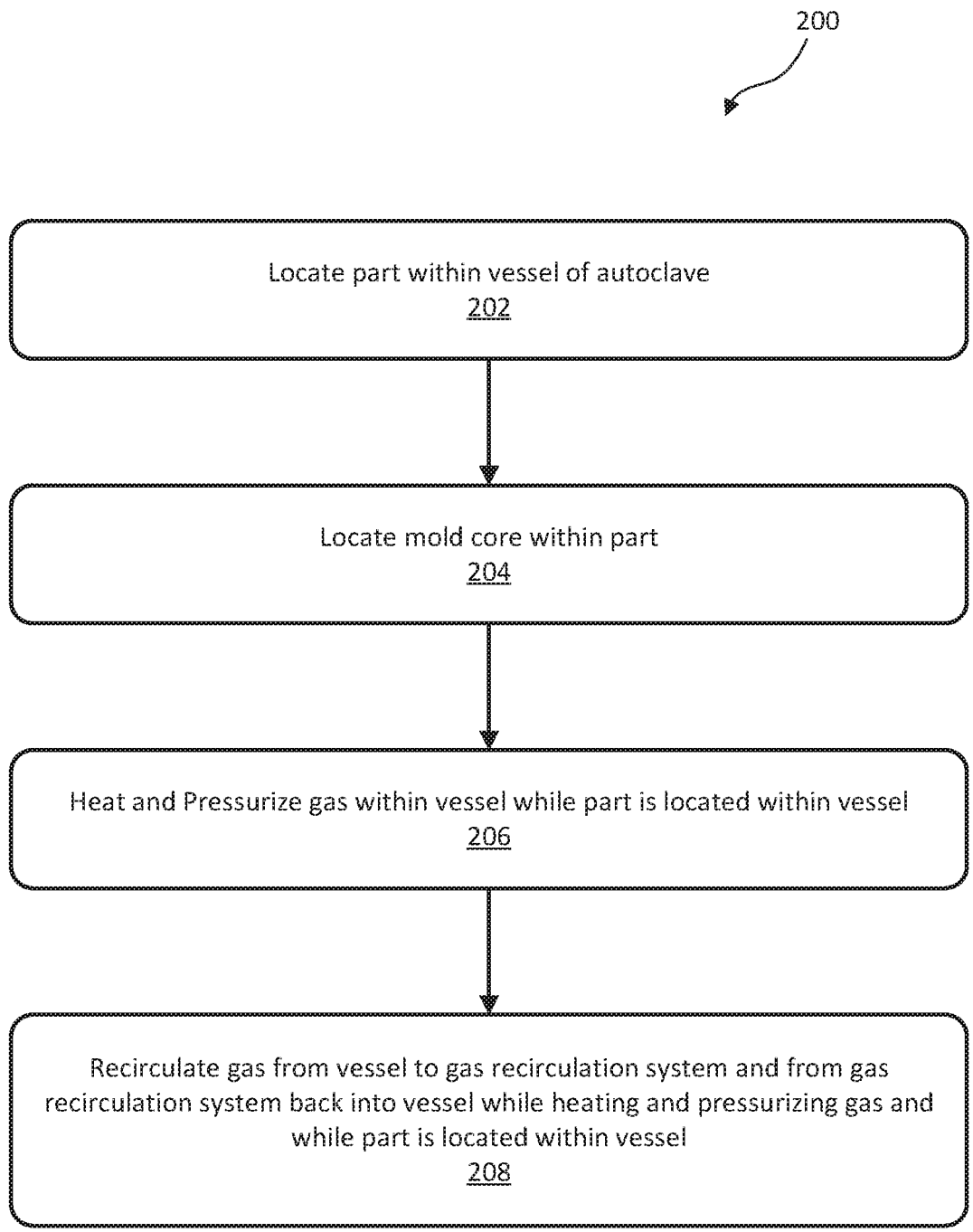
FIG. 6 is a schematic flow diagram of a method of curing a part using an autoclave, according to one or more examples of the present disclosure.

Referring to FIG. 6, one example of a method 200, which summarizes the method of curing the part 118 using the autoclave 110 and the autoclave system 100 as described throughout the above disclosure, is shown. The method 200 includes (block 202) locating the part 118 within the vessel 112 of the autoclave 110. The method 200 additionally includes (block 204) locating the mold core 140 within the part 118. More than one mold core 140 can be located within the part 118 and locating the mold core 140 within the part 118 can be executed before the part 118 is located within the autoclave 110 at block 202. In other words, the mold core 140 and the part 118 together can be located within the vessel 112 of the autoclave 110. The method 200 also includes (block 206) heating and pressurizing the gas 152 within the vessel 112 while the part 118 is located within the vessel 112. The heating of the gas 152 is performed adiabatically in some examples. The method 200 further includes (block 208) recirculating the gas 152 from the vessel 112 to the gas recirculation system 120 and from the gas recirculation system 120 back into the vessel 112 while heating and pressurizing the gas 152 at block 206 and while the part 118 is located within the vessel 112. In some examples, the gas 152 recirculated through the gas recirculation system 120 comes directly from the conduit 142 of the mold core 140. In certain examples, the method 200 additionally includes bypassing the gas recirculation system 120 and venting the gas 152 from the vessel 112 to the atmosphere. The method 200 can include a logic step to determine if the gas recirculation system 120 is enabled to receive the gas 152 from the vessel 112. If the gas recirculation system 120 is disabled, then the gas 152 can be vented to the atmosphere, such as via operation of the valve 174, instead of being recirculated back into the vessel 112.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An autoclave system for curing a part, the autoclave system comprising:
   an autoclave, comprising:
      a vessel, containing a gas;
      at least one circulator, located within the vessel and operable to circulate the gas within the vessel;
      at least one heater, located within the vessel and operable to heat the gas within the vessel; and
      a gas recirculation system, at least partially external to the vessel and fluidically coupleable to the vessel such that a portion of the gas contained in the vessel is delivered to the gas recirculation system, passed through the gas recirculation system, and recirculated back into the vessel; and
   at least one mold core, located within the vessel, comprising a conduit extending through the mold core, and configured to define a shape of the part, wherein the portion of the gas delivered to the gas recirculation system from the vessel is only gas that has passed through the conduit of the mold core and is received directly from the conduit of the mold core.

2. The autoclave system according to claim 1, wherein the gas recirculation system comprises a compressor that is operable to pressurize the gas received from the conduit of the mold core before the gas is recirculated back into the vessel.

3. The autoclave system according to claim 2, wherein:
   the gas within the vessel is at a first pressure; and
   the compressor is operable to pressurize the gas received from the conduit of the mold core to a second pressure greater than the first pressure such that the gas flows back into the vessel.

4. The autoclave system according to claim 3, wherein:
   the first pressure is at least 90 pounds-per-square-inch (psi);
   the second pressure is at least 100 psi; and
   a temperature of the gas within the vessel and the gas recirculation system is at least 350 degrees Fahrenheit.

5. The autoclave system according to claim 2, wherein the gas recirculation system further comprises a gas reservoir this is configured to receive the gas from the conduit of the mold core and deliver the gas, received by the gas reservoir, to the compressor.

6. The autoclave system according to claim 5, wherein:
   the gas recirculation system further comprises:
      a first recirculation conduit, fluidically coupled to the conduit of the mold core and the gas reservoir such that the gas flows from the conduit of the mold core to the gas reservoir via the first recirculation conduit; and
      a second recirculation conduit, fluidically coupled to the gas reservoir and the compressor such that the gas flows from the gas reservoir to the compressor via the second recirculation conduit;
   the first recirculation conduit has a first flow diameter;
   the second recirculation conduit has a second flow diameter; and
   the second flow diameter is greater than the first flow diameter.

7. The autoclave system according to claim 1, wherein:
   the vessel comprises a first chamber and a second chamber;
   the mold core is located within the first chamber;
   the circulator receives the gas, flowing through the first chamber in a first flow direction, after passing around the mold core and delivers the gas to the second chamber; and
   the gas recirculation system recirculates the gas into the first chamber of the vessel at a location downstream of the mold core and upstream of the circulator.

8. The autoclave system according to claim 1, further comprising a valve that receives the gas directly from the conduit of the mold core, wherein
   operation of the valve is switchable between a first state and a second state;
   in the first state, the valve directs the gas received directly from the conduit of the mold core to the gas recirculation system; and
   in the second state, the valve vents the gas received directly from the conduit of the mold core to atmosphere.

9. The autoclave system according to claim 1, wherein:
   the conduit of the mold core comprises an inlet end and an outlet end; and
   a diameter of the conduit at the inlet end is greater than at the outlet end.

10. The autoclave system according to claim 1, wherein the mold core further comprises a filter located within the conduit.

11. The autoclave system according to claim 1, wherein the gas comprises an inert gas.

12. The autoclave system according to claim 1, further comprising a plurality of mold cores located within the vessel, wherein the gas delivered to the gas recirculation system from the vessel is gas received directly from the conduit of each one of the plurality of mold cores.

13. The autoclave system according to claim 1, wherein:
   the mold core is configured to define the shape of a circumferentially enclosed portion of the part; and
   the conduit is circumferentially enclosed and extends entirely through an interior of the mold core.

14. The autoclave system according to claim 1, wherein the at least one mold core is configured to define an internal shape of the part.

15. An autoclave, comprising:
   a vessel, containing a gas;
   at least one circulator, located within the vessel and operable to circulate the gas within the vessel;
   at least one heater, located within the vessel and operable to heat the gas within the vessel; and
   a gas recirculation system, at least partially external to the vessel and fluidically coupleable to the vessel such that a portion of the gas contained in the vessel is delivered to the gas recirculation system, passed through the gas recirculation system, and recirculated back into the vessel, wherein:

the gas recirculation system is configured to be fluidically coupled to a conduit extending through a mold core;

the mold core configured to define a shape of a part that is located within the vessel; and the portion of the gas delivered to the gas recirculation system from the vessel is only gas that has passed through the conduit of the mold core and received directly from the conduit of the mold core.

16. The autoclave according to claim 15, wherein the gas recirculation system comprises a compressor that is operable to pressurize the gas received from the vessel before the gas is recirculated back into the vessel.

17. The autoclave according to claim 15, wherein only a portion of the gas within the vessel is delivered to the gas recirculation system.

18. A method of curing a part, the method comprising:
locating the part within a vessel of an autoclave, wherein the autoclave comprises:
at least one circulator, located within the vessel and operable to circulate the gas within the vessel;
at least one heater, located within the vessel and operable to heat the gas within the vessel; and
a gas recirculation system, at least partially external to the vessel and fluidically coupleable to the vessel;

locating at least one mold core within the part, wherein the at least one mold core comprises a conduit extending through the at least one mold core, and configured to define a shape of the part;

heating and pressurizing a gas within the vessel while the part is located within the vessel; and recirculating a portion of the gas from the vessel to the gas recirculation system, and from the gas recirculation system back into the vessel while heating and pressurizing the gas and while the part is located within the vessel, wherein the portion of the gas delivered to the gas recirculation system from the vessel is only gas that has passed through the conduit of the at least one mold core and is received directly from the conduit of the at least one mold core.

19. The method according to claim 18, wherein:
the gas within the vessel of the autoclave is heated and pressurized while the mold core and the part are located within the vessel.

20. The method according to claim 18, further comprising selectively bypassing the gas recirculation system and venting the gas from the vessel to atmosphere.

* * * * *